US010320253B2

(12) United States Patent
Nakamasu et al.

(10) Patent No.: US 10,320,253 B2
(45) Date of Patent: Jun. 11, 2019

(54) ARMATURE, ROTATING ELECTRIC MACHINE, CROSS-FLOW FAN, AND METHOD FOR MANUFACTURING PAIR OF TEETH OF ARMATURE

(71) Applicant: DAIKIN INDUSTRIES, LTD., Osaka-shi, Osaka (JP)

(72) Inventors: Shin Nakamasu, Osaka (JP); Hiroki Fujita, Osaka (JP); Hirokazu Fujii, Osaka (JP); Ryou Fukui, Osaka (JP); Kouji Inoue, Osaka (JP); Junichi Satou, Osaka (JP)

(73) Assignee: DAIKIN INDUSTRIES, LTD., Osaka-Shi, Osaka (JP)

( * ) Notice: Subject to any disclaimer, the term of this patent is extended or adjusted under 35 U.S.C. 154(b) by 378 days.

(21) Appl. No.: 15/322,901

(22) PCT Filed: Jun. 29, 2015

(86) PCT No.: PCT/JP2015/068620
§ 371 (c)(1),
(2) Date: Dec. 29, 2016

(87) PCT Pub. No.: WO2016/002690
PCT Pub. Date: Jan. 7, 2016

(65) Prior Publication Data
US 2017/0155296 A1    Jun. 1, 2017

(30) Foreign Application Priority Data

Jul. 1, 2014   (JP) .................. 2014-135688

(51) Int. Cl.
*H02K 3/18*    (2006.01)
*H02K 1/27*    (2006.01)
(Continued)

(52) U.S. Cl.
CPC ............ *H02K 3/18* (2013.01); *H02K 1/2786* (2013.01); *H02K 3/522* (2013.01); *H02K 15/095* (2013.01);
(Continued)

(58) Field of Classification Search
CPC ...... H02K 3/18; H02K 3/28; H02K 3/50–522; H02K 1/2786; H02K 2203/03;
(Continued)

(56) References Cited

U.S. PATENT DOCUMENTS 5,859,486 A * 1/1999 Nakahara ................. H02K 1/14
310/216.004
7,821,165 B2   10/2010 Yamane et al.
(Continued)

FOREIGN PATENT DOCUMENTS

DE    102011100121 A1   10/2012
EP    1729398 A2        12/2006
(Continued)

*Primary Examiner* — Jue Zhang
(74) *Attorney, Agent, or Firm* — Birch, Stewart, Kolasch & Birch, LLP

(57) ABSTRACT

An armature coil includes a first portion, a second winding portion, a first winding end, a second winding end, and a crossover portion, and is continuously wound. The first winding portion is concentratedly wound in a counterclockwise winding direction with respect to a direction obtained in viewing a second end portion from a first end portion of a tooth, as it passes from the first winding end to the crossover portion. The second winding portion is concentratedly wound in a clockwise winding direction with respect to a direction obtained in viewing a second end portion from a first end portion of the tooth, as it passes from the crossover portion to the second winding end.

7 Claims, 13 Drawing Sheets

(51) Int. Cl.
    *H02K 3/52* (2006.01)
    *H02K 15/095* (2006.01)
    *H02K 3/28* (2006.01)
    *H02K 21/22* (2006.01)
    *H02K 1/14* (2006.01)

(52) U.S. Cl.
    CPC ............... *H02K 1/148* (2013.01); *H02K 3/28* (2013.01); *H02K 21/222* (2013.01); *H02K 2203/03* (2013.01)

(58) Field of Classification Search
    CPC ...... H02K 1/146; H02K 1/148; H02K 21/222; H02K 15/095
    USPC .................................................... 310/71, 198
    See application file for complete search history.

(56) References Cited

U.S. PATENT DOCUMENTS

| | | | | |
|---|---|---|---|---|
| 2001/0048262 A1* | 12/2001 | Takano | ................. | H02K 1/148 310/179 |
| 2006/0055272 A1* | 3/2006 | Lee | ....................... | H02K 1/146 310/208 |
| 2008/0116755 A1* | 5/2008 | Sahara | ................... | H02K 3/522 310/71 |
| 2008/0143203 A1* | 6/2008 | Purvines | ................ | H02K 1/148 310/71 |
| 2014/0062254 A1 | 3/2014 | Nakatsugawa et al. | | |
| 2014/0091656 A1 | 4/2014 | Miyashita et al. | | |
| 2016/0380522 A1* | 12/2016 | Woo | ....................... | H02K 3/522 310/68 B |

FOREIGN PATENT DOCUMENTS

| | | |
|---|---|---|
| JP | 2001-204147 A | 7/2001 |
| JP | 2010-193675 A | 9/2010 |
| JP | 2010-246352 A | 10/2010 |
| JP | 4670868 B2 | 4/2011 |
| JP | 2012-125057 A | 6/2012 |
| JP | 5356897 B2 | 12/2013 |
| JP | 2014-50211 A | 3/2014 |
| JP | 2014-73047 A | 4/2014 |

* cited by examiner

F I G. 9
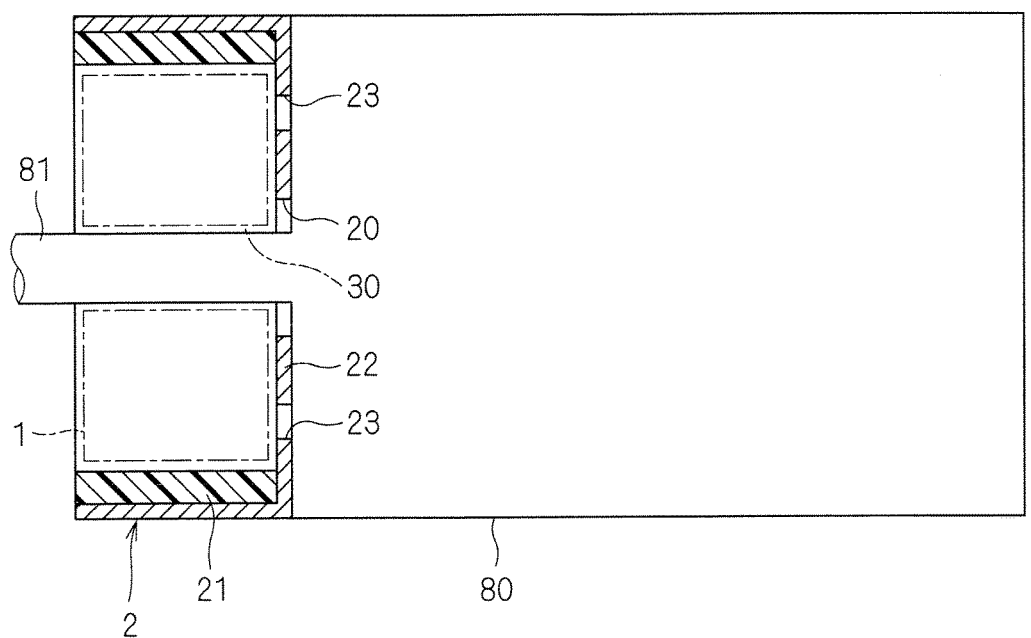

F I G . 1 0
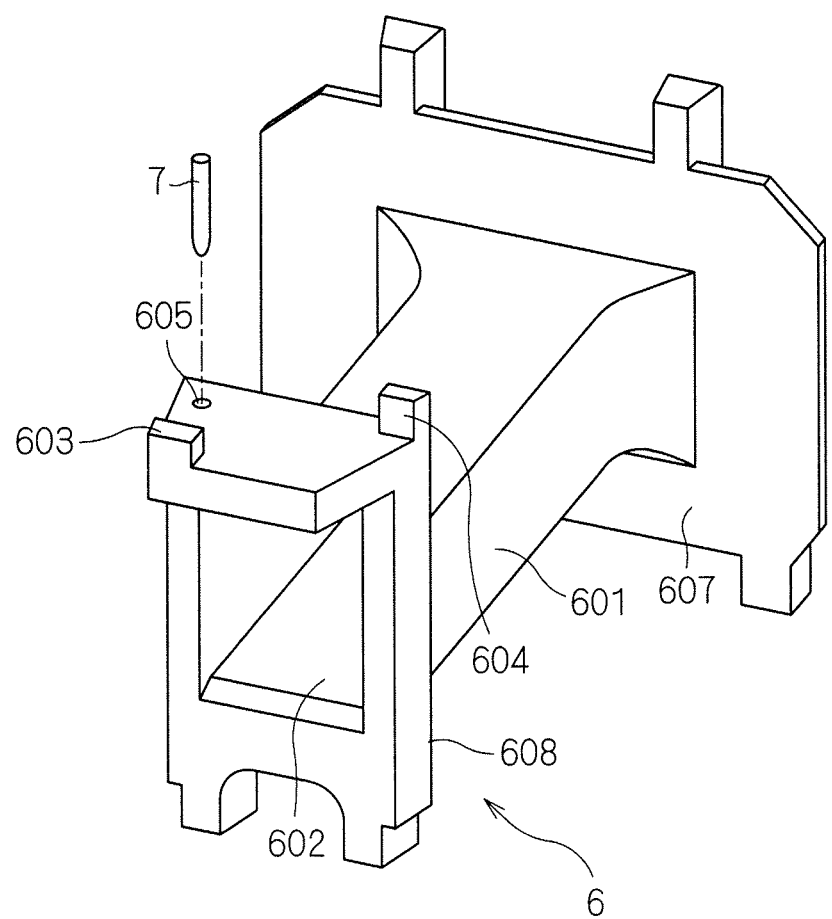

ARMATURE, ROTATING ELECTRIC MACHINE, CROSS-FLOW FAN, AND METHOD FOR MANUFACTURING PAIR OF TEETH OF ARMATURE

TECHNICAL FIELD

The present disclosure relates to an armature including 12n teeth (n is a positive integer) arranged in a circumferential direction and an armature coil concentratedly wound around each of these teeth, and particularly to an armature composing a rotating electric machine with a field element having $(12\pm2)n$ poles.

BACKGROUND ART

Motors often have problems with exciting forces in its rotating direction (hereinafter provisionally referred to as "rotating exciting forces"). The rotating exciting forces are broadly divided into cogging torque with no current applied, and torque ripple with a current applied.

It is known that when N denotes the number of slots and P denotes the number of poles (N and P are positive integers), the order of harmonics of cogging torque is the lowest common multiple of N and P.

For example, the respective orders are compared between a motor with 8 poles and 12 slots and a motor with 10 poles and 12 slots. The lowest common multiple of 8 and 12 of the former is 24, whereas the lowest common multiple of 10 and 12 of the latter is 60. Since the order of the cogging torque per turn of the rotor of the latter motor is larger than that of the former, the peak value of the cogging torque of the latter motor is reduced.

As such, motors with $(12\pm2)n$ poles and 12n teeth (hereinafter provisionally referred to as "12-slot series motors") are recognized as promising motors with little vibration and noise. Particularly, fields where smooth torque transfer is necessary (e.g., electric power steering (EPS) for vehicles and fan drive motors) require lower rotating exciting forces. Thus, the 12-slot series motors are used in these fields (for example, Japanese Patent Application Laid-Open No. 2001-204147).

However, since the winding directions and connection of concentratedly-wound armatures in the 12-slot series motors are more complicated than those of the motors with 8 poles and 12 slots, a problem with deteriorating industrial productivity is known.

In order to address this problem, in Japanese Patent Application Laid-Open No. 2010-193675, two connection nozzles are provided per phase, by which respective armature coils are wound parallel in opposite directions. Accordingly, the armature coils can be wound with the connection nozzles operated in the same direction, thus indicating that Japanese Patent Application Laid-Open No. 2010-193675 discloses a technique for increasing the productivity.

SUMMARY OF INVENTION

Problems to be Solved by the Invention

However, in Japanese Patent Application Laid-Open No. 2010-193675, armature coils are wound in a complicated manner, such as:
(i) when the armature coils wound around a pair of teeth that are adjacent in a circumferential direction are in the same phase, the winding directions are opposite to each other with respect to the center of the armature;
(ii) when the armature coils wound around a pair of teeth that are adjacent in a circumferential direction are in different phases, the winding directions are the same with respect to the center of the armature; and
(iii) when the armature coils wound around a pair of teeth that are directly opposite to each other (i.e., displaced 180 degrees in a circumferential direction), the winding directions are opposite to each other with respect to the center of the armature.

Furthermore, it is necessary to wind an armature coil around each of the teeth in a unified shape. Thus, winding armature coils in the same phase in parallel with each other around the teeth that are adjacent in the circumferential direction reduces a space factor of the armature coils. To avoid such reduction, winding the armature coils at time intervals reduces the productivity.

Furthermore, among the lines for connecting the armature coils wound around respective different teeth (generally called "crossover lines"), the ones for connecting the armature coils that are directly opposite to each other in a circumferential direction and in the same phase need to be routed with a length approximately half a circumference of the armature along the circumferential direction. This causes a problem of increasing the electrical resistance of the armature coils.

Japanese Patent Application Laid-Open No. 2014-73047 discloses a technique for winding armature coils around respective divided cores in the same direction. Furthermore, Japanese Patent Application Laid-Open No. 2014-73047 discloses a technique for eliminating a crossover line by mutually connecting the winding coils for teeth on a multilayer wiring board, whereby the problem of Japanese Patent Application Laid-Open No. 2010-193675 is solved.

However, the number of wiring layers necessary for the multilayer wiring board is four. Although Japanese Patent Application Laid-Open No. 2014-73047 describes that the number of wiring layers has been reduced, the multilayer wiring board is still expensive if the number of the layers is four. Furthermore, the number of pins necessary to route crossover lines from the armature coils is twice the number of the slots (24 pins in Japanese Patent Application Laid-Open No. 2014-73047).

Furthermore, although four armature coils are provided per phase in both Japanese Patent Application Laid-Open Nos. 2010-193675 and 2014-73047, two current paths are connected in parallel in the phase. Thus, these two current paths sometimes differ in induced voltage. Since a ring current flows herein, a Joule loss occurs. Furthermore, there are problems with reduction in the induced voltage in the entirety of the phase and with deterioration in the torque characteristics and the loss characteristics of the motor.

Japanese Patent No. 4670868 describing the similar techniques has problems similar to those of Japanese Patent Application Laid-Open No. 2014-73047.

The present disclosure has been conceived in view of the above problems, and provides techniques for connecting armature coils per phase in series with each other and reducing the number of pins necessary to route crossover lines from the armature coils.

Means to Solve the Problems

An armature (1) according to the present disclosure includes: 12n teeth (Tu1 to Tu4, Tv1 to Tv4, Tw1 to Tw4) arranged in a circumferential direction; and an armature coil concentratedly wound around each of the teeth (Tu1, Tu2), and composes a rotating electric machine with a field element (2) having (12±2)n poles, n being a positive integer.

In a first aspect, the 12n teeth are divided into 6n tooth pairs, each of the tooth pairs (Tua) including a pair of teeth (Tu1, Tu2) adjacent in the circumferential direction.

Each of the teeth includes a first end portion (Tu1i, Tu2i) that is farther from the field element, and a second end portion (Tu1o, Tu2o) that is closer to the field element.

The armature coil (Lua) is continuously wound around each of the tooth pairs and includes: a first winding end (Luas) existing at the first end portion (Tu1i) of one of the pair of teeth (Tu1); a second winding end (Luae) existing at the first end portion (Tu2i) of the other of the pair of teeth (Tu2); a crossover portion (Luab); a first winding portion (Lu1) being wound around the one of the pair of teeth between the first winding end and the crossover portion; and a second winding portion (Lu2) being wound around the other of the pair of teeth between the crossover portion and the second winding end.

The armature coil in the first winding portion is wound in a first winding direction (Ru1) with respect to a direction (Du1) obtained in viewing the second end portion from the first end portion of the one of the pair of teeth, as the armature coil passes from the first winding end to the crossover portion.

The armature coil in the second winding portion is wound in a second winding direction (Ru2) with respect to a direction (Du2) obtained in viewing the second end portion from the first end portion of the other of the pair of teeth, as the armature coil passes from the crossover portion to the second winding end.

The first winding direction is opposite to the second winding direction.

The armature (1) according to the first aspect of the present disclosure further includes a printed circuit board (PCB) (3) in a second aspect.

The printed circuit board includes: a wiring pattern (Pn) mutually connecting the second winding end of a first one of the tooth pairs (Tub), the first winding end of a second one of the tooth pairs (Tvb), and the first winding end of a third one of the tooth pairs (Twb); a wiring pattern (Pxu) mutually connecting the first winding end of the first one of the tooth pairs (Tub) and the first winding end of a fourth one of the tooth pairs (Tua); a wiring pattern (Pxv) mutually connecting the second winding end of the second one of the tooth pairs (Tvb) and the second winding end of a fifth one of the tooth pairs (Tva); and a wiring pattern (Pxw) mutually connecting the second winding end of the third one of the tooth pairs (Twb) and the second winding end of a sixth one of the tooth pairs (Twa).

The first winding portion (Lu3) of the first one of the tooth pairs (Tub), the second winding portion (Lu4) of the first one of the tooth pairs, the first winding portion (Lw3) of the third one of the tooth pairs (Twb), the second winding portion (Lw4) of the third one of the tooth pairs, the first winding portion (Lv1) of the fifth one of the tooth pairs (Tva), the second winding portion (Lv2) of the fifth one of the tooth pairs, the first winding portion (Lu1) of the fourth one of the tooth pairs (Tua), the second winding portion (Lu2) of the fourth one of the tooth pairs, the first winding portion (Lw1) of the sixth one of the tooth pairs (Twa), the second winding portion (Lw2) of the sixth one of the tooth pairs, the first winding portion (Lv3) of the second one of the tooth pairs (Tvb), and the second winding portion (Lv4) of the second one of the tooth pairs are arranged in the circumferential direction in this order.

A rotating electric machine according to the present disclosure includes the armature (1) according to the second aspect and the field element (2). Desirably, the field element (2) includes magnets (21) surrounding the armature (1), and the rotating electric machine is of an outer rotor type. Desirably, the magnets are resin magnets.

A cross-flow fan according to the present disclosure is driven by the rotating electric machine.

A method for manufacturing the tooth pairs of the armature according to the present disclosure is a method for manufacturing the tooth pairs to be employed in the armature according to the first aspect.

The method includes the steps of: arranging the first end portions of the pair of teeth that form each of the tooth pairs to be opposite to each other to obtain a first structure; winding a wire around the pair of teeth in one direction in the first structure and forming the armature coil on the pair of teeth to obtain a second structure; and bringing the second end portions of the pair of teeth in the second structure closer to each other and directing the first end portions almost in a same direction.

Effects of the Invention

With the first aspect of the armature according to the present disclosure, the number of pins for armature coils can be reduced.

With the second aspect, the armature according to the present disclosure can generate a 12-pole rotating electric field with application of three-phase voltages to the second winding end of the fourth one of the tooth pairs (Tua), the first winding end of the fifth one of the tooth pairs (Tva), and the first winding end of the sixth one of the tooth pairs (Twa).

When the rotating electric machine according to the present disclosure is particularly of an outer rotor type, the PCB can be miniaturized. This is because the outside diameter of the armature is smaller than that of the rotor and a diameter of an outlined circle obtained by connecting the first end portions of the teeth is smaller than the outside diameter of the armature by the length of the teeth.

When the rotating electric machine according to the present disclosure is of an outer rotor type and drives a cross-flow fan, the area of the magnets can be increased when designed. Thus, a material with a lower magnetic flux density suffices as the magnets to be used, which contributes to low manufacturing costs. For example, resin magnets obtained by mixing a magnetic powder with a resin are available.

When the rotating electric machine is of an outer rotor type, the magnets are easily multi-polarized. Since the rotating electric machine has a larger outside diameter, the arc length per pole is made longer. Thus, when the dimensional tolerance in mass production is consistent as the absolute value (e.g., ±0.1 mm, etc.), the dimensional deviation in polar angle can be set with higher precision for the mass production than that of magnets with a smaller diameter to be employed by a rotating electric machine of an inner rotor type. This is advantageous in reducing the vibration and noise.

Furthermore, when the magnets are resin magnets, a field element with different number of poles is easily obtained. This is because a mold and a magnetizing yoke have only to be newly built for the resin magnets with different number of poles while the armature remains the same as the conventional ones. Particularly, when a rotor is solely composed of resin magnets, parts for fixing the magnets do not have to be newly produced per different numbers of poles of the magnets, and the parts can be the same as the conventional ones.

The tooth pairs are easily manufactured in the method for manufacturing tooth pairs according to the present disclosure.

The objects, features, aspects and advantages of the present disclosure will become more apparent from the following detailed description and the accompanying drawings.

BRIEF DESCRIPTION OF DRAWINGS

FIG. 9 is a cross-sectional view illustrating a structure of a cross-flow fan;

FIG. 10 is a perspective view illustrating a shape of an insulator;

DESCRIPTION OF EMBODIMENTS

A motor as an example of a 12-slot series motor where n=1, that is, a motor with 10 or 14 poles and 12 teeth will be described hereinafter. The following description holds even for n≥2.

Figure 1:
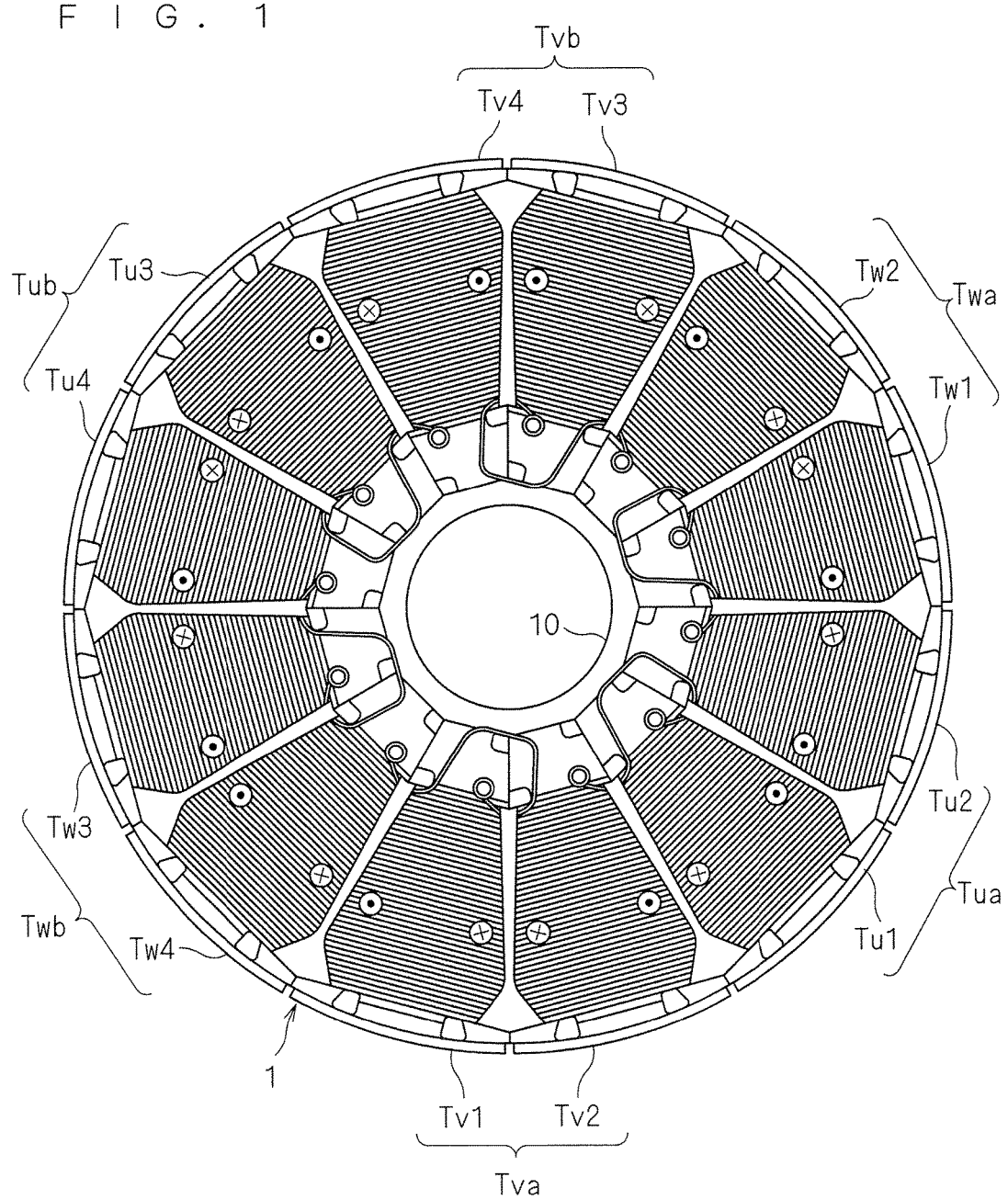
FIG. 1 is a plan view illustrating a structure of an armature according to an embodiment of the present disclosure.

FIG. 1 is a plan view illustrating a structure of an armature 1 according to an embodiment of the present disclosure. The armature 1 further includes a PCB 3 to be described later.

Figure 2:
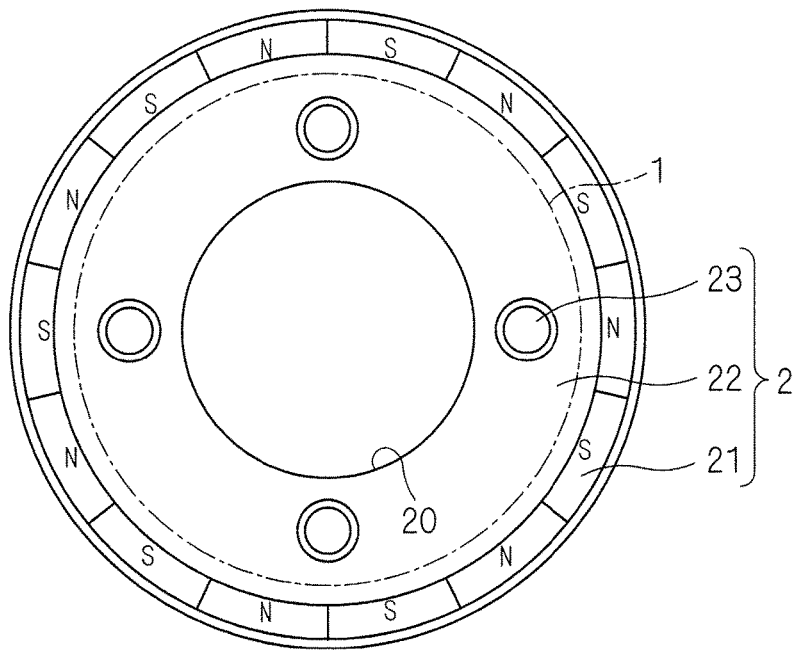
FIG. 2 is a plan view illustrating a structure of a field element composing a rotating electric machine with the armature.
Figure 3:
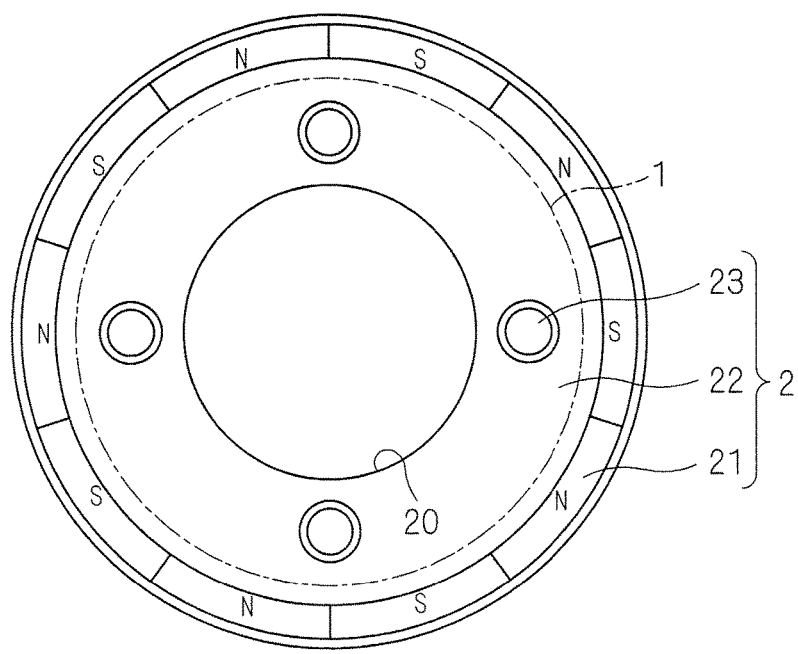
FIG. 3 is a plan view illustrating a structure of a field element composing a rotating electric machine with the armature.

FIGS. 2 and 3 are plan views each illustrating a structure of a field element 2 composing a rotating electric machine with the armature 1. The rotating electric machine is of an outer rotor type, and the field element 2 is a rotor including magnets 21 surrounding the armature 1 (represented by a virtual chain line).

FIG. 2 illustrates a case where the field element 2 has 14 poles (=12+2), whereas FIG. 3 illustrates a case where the field element 2 has 10 poles (=12−2). Specifically, fourteen of the magnets 21 in FIG. 2 and ten of the magnets 21 are arranged in each of the circumferential directions. In either of the cases, the magnets 21 adjacent in the circumferential direction have different polarities (N/S) with respect to the armature 1.

The magnets 21 are desirably resin magnets. This is because there is no need to prepare the magnets 21 separately to obtain the necessary number of poles for the field element 2 and the magnets 21 are easily obtained only by differing in the magnetizing process.

The resin magnets are obtained by dispersively mixing, in a resin binder, for example a ferrite magnetic powder or a rare-earth magnetic powder such as a neodymium magnet (NdFeB) powder.

The field element 2 includes mounting holes 23 and a mounting surface 22 on which a shaft hole 20 is opened. An object to be driven by the rotating electric machine (for example, a cross-flow fan for moving air) is fixed to the mounting surface 22 by a fastener (not illustrated) through the mounting holes 23. Accordingly, rotation of the field element 2 induces rotation of the object. A shaft (not illustrated) fixed to the object pierces through the shaft hole 20, and is supported to be rotatable against the armature 1.

Again, the structure of the armature 1 will be described with reference to FIG. 1. The armature 1 has a through-hole 10 which is opened at the center and through which the shaft pierces. The armature 1 does not necessarily require the through-hole 10 to be opened.

Around the center of the armature 1 (the through-hole 10 herein), 12 teeth are arranged in the circumferential direction. More specifically, teeth Tu1, Tu2, Tw1, Tw2, Tv3, Tv4, Tu3, Tu4, Tw3, Tw4, Tv1, and Tv2 are arranged counter-clockwise in this order in FIG. 1.

These 12 teeth are divided into 6 tooth pairs each including a pair of teeth adjacent in the circumferential direction. Specifically, the teeth Tu1 and Tu2 form a tooth pair Tua, the teeth Tw1 and Tw2 form a tooth pair Twa, the teeth Tv3 and Tv4 form a tooth pair Tvb, the teeth Tu3 and Tu4 form a tooth pair Tub, the teeth Tw3 and Tw4 form a tooth pair Twb, and the teeth Tv1 and Tv2 form a tooth pair Tva.

The armature coils are concentratedly wound around the respective teeth. Thus, the drawings schematically illustrate wires composing the armature coils.

In FIG. 1, white circles enclosing black dots (hereinafter provisionally referred to as "dotted circles") and white circles enclosing X (hereinafter provisionally referred to as "X circles") schematically illustrate each a current that flows through the armature coil. The dotted circles indicate the flow from the back to the front of the paper, whereas the X circles indicate the flow from the front to the back of the paper.

Specifically, the armature coils wound around the teeth Tu1, Tu2, Tu3, and Tu4 correspond to a U phase. Furthermore, currents flow through the armature coil wound around the teeth Tu1 and Tu2 forming the tooth pair Tua, in opposite directions with respect to the center of the armature 1. The same holds true for the teeth Tu3 and Tu4 forming the tooth pair Tub. Currents flow through the armature coils wound around the teeth Tu1 and Tu3 that are directly opposite to each other, in opposite directions with respect to the center of the armature 1.

The armature coils wound around the teeth Tv1, Tv2, Tv3, and Tv4 correspond to a V phase, and the armature coils wound around the teeth Tw1, Tw2, Tw3, and Tw4 correspond to a W phase. The armature coils wound around these teeth have the same relationship with those in the U phase as to the directions of the currents that flow therethrough.

The currents that flow through the armature coils in any two of the U phase, the V phase, and the W phase have the same polarity, and the currents that flow through the armature coils in the other one phase have a different polarity. What is exemplified here is a case where the currents that flow through the V phase and the W phase have the same polarity and the currents that flow through the U phase have a different polarity.

Figure 4:
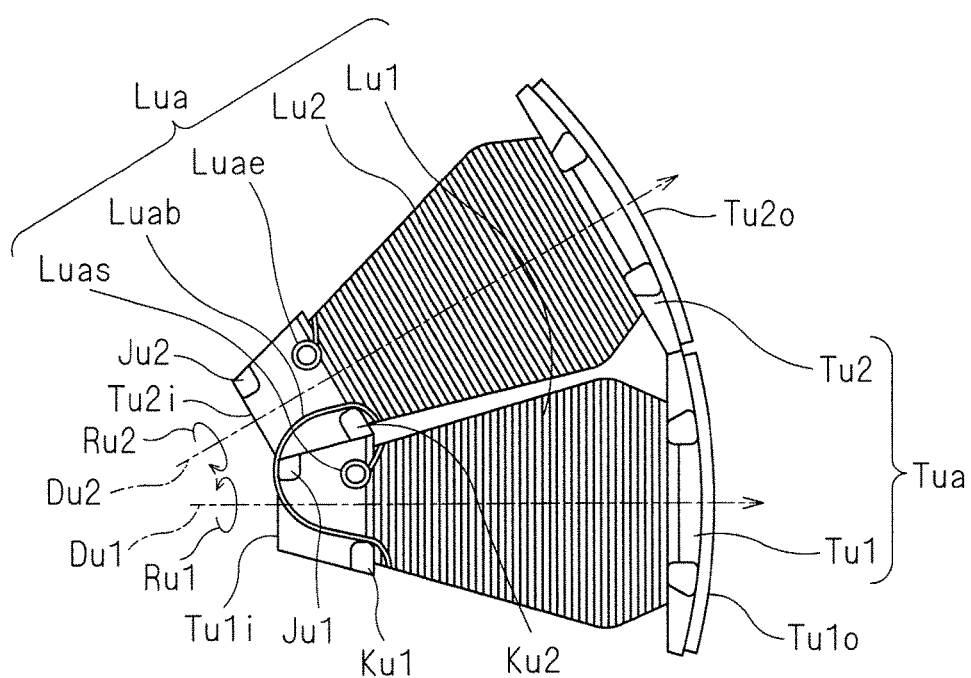
FIG. 4 is a plan view illustrating a structure of a tooth pair.

FIG. 4 is a plan view illustrating a structure of the tooth pair Tua. The tooth Tu1 includes a first end portion Tu1i that is farther from the field element 2 (here, closer to the through-hole 10 in FIG. 1), and a second end portion Tu1o that is closer to the field element 2. The tooth Tu2 includes a first end portion Tu2i that is farther from the field element 2, and a second end portion Tu2o that is closer to the field element 2.

An armature coil Lua for the whole tooth pair Tua includes a first winding portion Lu1, a second winding portion Lu2, a first winding end Luas, a second winding end Luae, and a crossover portion Luab, and is continuously wound. More specifically, each of the teeth Tu1 and Tu2 is covered with an insulator, and the armature coil Lua is wound around the teeth Tu1 and Tu2 through these insulators.

The first winding end Luas exists at the first end portion Tu1i of the tooth Tu1, and the second winding end Luae exists at the first end portion Tu2i of the tooth Tu2. More specifically, the insulator of the tooth Tu1 has a pin at the first end portion Tu1i. The first winding end Luas is connected to the pin. Similarly, the insulator of the tooth Tu2 has a pin at the first end portion Tu2i, and the second winding end Luae is connected to the pin.

The first winding portion Lu1 is concentratedly wound around the tooth Tu1 between the first winding end Luas and the crossover portion Luab. The second winding portion Lu2 is concentratedly wound around the tooth Tu2 between the crossover portion Luab and the second winding end Luae.

The armature coil Lua in the first winding portion Lu1 is wound in a counterclockwise direction Ru1 with respect to a direction Du1 obtained in viewing the second end portion Tu1o from the first end portion Tu1i, as it passes from the first winding end Luas to the crossover portion Luab.

The armature coil Lua in the second winding portion Lu2 is wound in a clockwise direction Ru2 with respect to a direction Du2 obtained in viewing the second end portion Tu2o from the first end portion Tu2i, as it passes from the crossover portion Luab to the second winding end Luae.

Thus, currents can flow through the first winding portion Lu1 and the second winding portion Lu2 in opposite directions to implement the directions of currents illustrated as the dotted circles and the X circles in the tooth pair Tua in FIG. 1 by allowing a current to flow through the armature coil Lua between the first winding end Luas and the crossover portion Luab.

Protrusions Ku1 and Ju1 that protrude on a side in an extension direction of the shaft (vertical to the paper and oriented frontward in FIG. 4) are provided at a portion of the insulator of the tooth Tu1 that is closer to the first end portion Tu1i. The protrusion Ku1 is closer to the field element 2 than the protrusion Ju1, and placed on the clockwise direction side of the circumferential direction with respect to the protrusion Ju1. Protrusions Ku2 and Ju2 corresponding to the protrusions Ku1 and Ju1, respectively, are provided at a portion of the insulator of the tooth Tu2 that is closer to the first end portion Tu2i.

The crossover portion Luab passes, for example, from the first winding portion Lu1 through a position between the protrusions Ju1 and Ku1, then on a side farther from the field element 2 than the protrusion Ju1, and through a position between the protrusions Ju2 and Ku2, and reaches the second winding portion Lu2. Thus, the protrusions Ku1, Ju1, and Ku2 contribute to positioning of the crossover portion Luab.

In the armature coil Lua, the first winding portion Lu1 and the second winding portion Lu2 are wound around the tooth pair Tua through the crossover portion Luab using a continuous wire whose end portions are only two of the first winding end Luas and the second winding end Luae.

The other tooth pairs have the same structure as that of FIG. 4. Thus, the armature coil has one end portion per tooth. Thus, the number of pins necessary to route crossover lines from the armature coils is cut in half compared with those according to Patent Documents 2 to 4.

Figure 5:
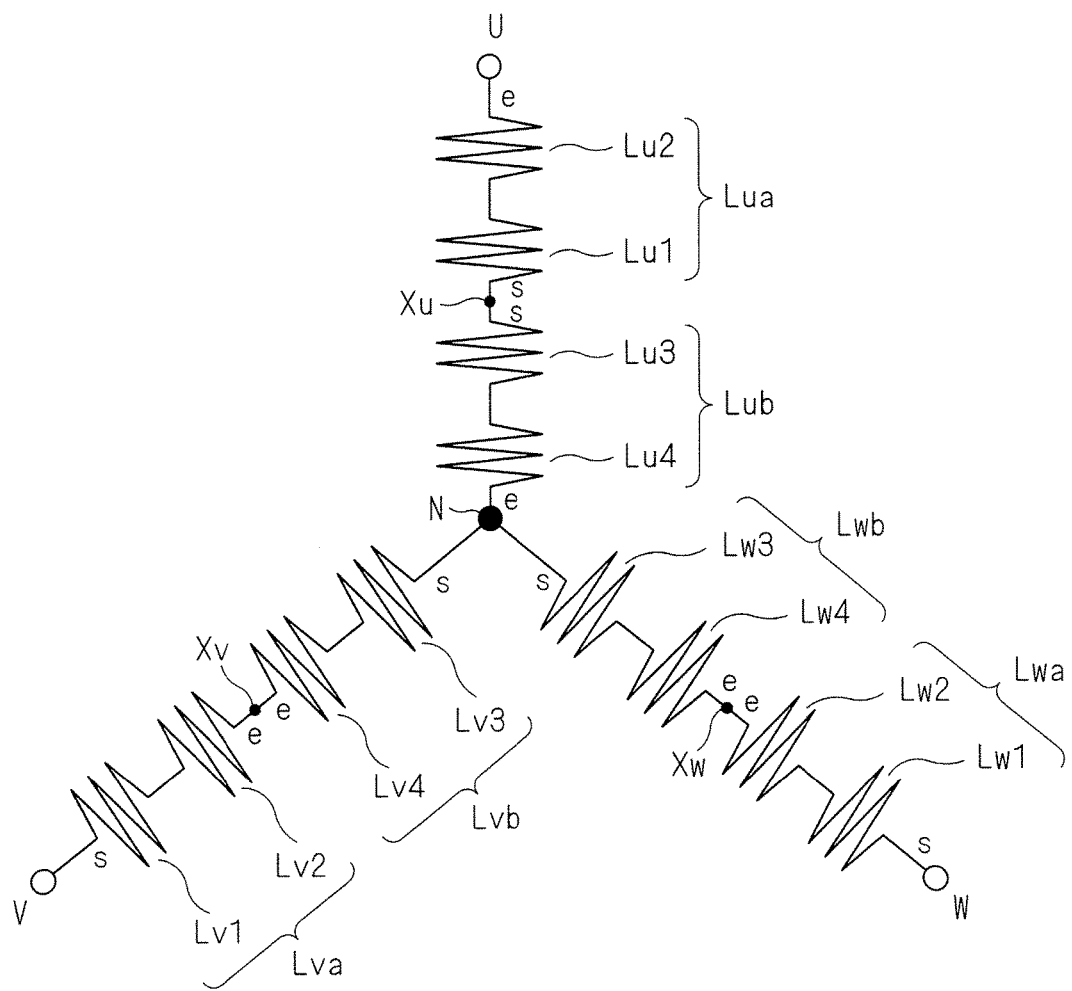
FIG. 5 is a connection diagram illustrating a connection state of armature coils.

FIG. 5 is a connection diagram illustrating a connection state of the armature coils. In FIG. 5, the first winding end Luas and the second winding end Luae of the armature coil Lua are represented by symbols "s" and "e", respectively. The first winding portion Lu1 and the second winding portion Lu2 are connected through the crossover portion Luab as apparent from the previous description.

An armature coil Lub is provided around the tooth pair Tub, and includes a first winding portion Lu3 and a second winding portion Lu4 corresponding to the first winding portion Lu1 and the second winding portion Lu2, respectively. The symbol "s" is attached to a portion of the first winding portion Lu3 opposite to the second winding portion Lu4, that is, a portion corresponding to the first winding end Luas of the armature coil Lua. Furthermore, the symbol "e" is attached to a portion of the second winding portion Lu4 opposite to the first winding portion Lu3, that is, a portion corresponding to the second winding end Luae of the armature coil Lua.

The armature coils Lua and Lub are connected at a connection point Xu through the portions each with the symbol "s". Accordingly, the second winding portion Lu2, the first winding portion Lu1, the first winding portion Lu3, and the second winding portion Lu4 are connected in series in this order. Since the structure illustrated in FIG. 4 holds true for the armature coil Lub, the winding direction viewed along a radial direction from the center of the armature 1 (for example, closer to the through-hole 10) is common between the first winding portions Lu1 and Lu3, and between the second winding portions Lu2 and Lu4. The connection above causes currents to flow through the first winding portions Lu1 and Lu3 in opposite directions, and through the second winding portions Lu2 and the Lu4 in opposite directions. Accordingly, the directions of currents illustrated as the dotted circles and the X circles in the tooth pairs Tua and Tub in FIG. 1 can be implemented.

Similarly, an armature coil Lva is provided around the tooth pair Tva, and includes a first winding portion Lv1 and a second winding portion Lv2 corresponding to the first winding portion Lu1 and the second winding portion Lu2, respectively. A portion of the first winding portion Lv1 opposite to the second winding portion Lv2 corresponds to the first winding end Luas of the armature coil Lua, and the symbol "s" is attached to the portion. A portion of the second winding portion Lv2 opposite to the first winding portion Lv1 corresponds to the second winding end Luae of the armature coil Lua, and the symbol "e" is attached to the portion.

An armature coil Lvb is provided around the tooth pair Tvb, and includes a first winding portion Lv3 and a second winding portion Lv4 corresponding to the first winding portion Lu1 and the second winding portion Lu2, respectively. A portion of the first winding portion Lv3 opposite to the second winding portion Lv4 corresponds to the first winding end Luas of the armature coil Lua, and the symbol "s" is attached to the portion. A portion of the second winding portion Lv4 opposite to the first winding portion Lv3 corresponds to the second winding end Luae of the armature coil Lua, and the symbol "e" is attached to the portion.

The armature coils Lva and Lvb are connected at a connection point Xv through the portions each with the symbol "e". Accordingly, the first winding portion Lv1, the second winding portion Lv2, the second winding portion Lv4, and the first winding portion Lv3 are connected in series in this order. Thus, the winding direction viewed along a radial direction from the center of the armature 1 is common between the first winding portions Lv1 and Lv3, and between the second winding portions Lv2 and Lv4. The connection above causes currents to flow through the first winding portions Lv1 and the Lv3 in opposite directions, and through the second winding portions Lv2 and the Lv4 in opposite directions. Accordingly, the directions of currents illustrated as the dotted circles and the X circles in the tooth pairs Tva and Tvb in FIG. 1 can be implemented.

Similarly, an armature coil Lwa is provided around the tooth pair Twa, and includes a first winding portion Lw1 and a second winding portion Lw2 corresponding to the first winding portion Lu1 and the second winding portion Lu2, respectively. A portion of the first winding portion Lw1 opposite to the second winding portion Lw2 corresponds to the first winding end Luas of the armature coil Lua, and the symbol "s" is attached to the portion. A portion of the second winding portion Lw2 opposite to the first winding portion Lw1 corresponds to the second winding end Luae of the armature coil Lua, and the symbol "e" is attached to the portion.

An armature coil Lwb is provided around the tooth pair Twb, and includes a first winding portion Lw3 and a second winding portion Lw4 corresponding to the first winding portion Lu1 and the second winding portion Lu2, respectively. A portion of the first winding portion Lw3 opposite to the second winding portion Lw4 corresponds to the first winding end Luas of the armature coil Lua, and the symbol "s" is attached to the portion. A portion of the second winding portion Lw4 opposite to the first winding portion Lw3 corresponds to the second winding end Luae of the armature coil Lua, and the symbol "e" is attached to the portion.

The armature coils Lwa and Lwb are connected at a connection point Xw through the portions each with the symbol "e". Accordingly, the first winding portion Lw1, the second winding portion Lw2, the second winding portion Lw4, and the first winding portion Lw3 are connected in series in this order. Thus, the winding direction viewed along a radial direction from the center of the armature 1 is common between the first winding portions Lw1 and Lw3, and between the second winding portions Lw2 and Lw4. The connection above causes currents to flow through the first winding portions Lw1 and Lw3 in opposite directions, and through the second winding portions Lw2 and Lw4 in opposite directions. Accordingly, the directions of currents illustrated as the dotted circles and the X circles in the tooth pairs Twa and Twb in FIG. 1 can be implemented.

The portion of the second winding portion Lu4 corresponding to the second winding end Luae, the portion of the first winding portion Lv3 corresponding to the first winding end Luas, and the portion of the first winding portion Lw3 corresponding to the first winding end Luas are connected at a connection point N. With application of (i) a U-phase voltage to the second winding end Luae of the second winding portion Lu2, (ii) a V-phase voltage to the portion of the first winding portion Lv1 corresponding to the first winding end Luas, and (iii) a W-phase voltage to the portion of the winding portion Lw1 corresponding to the first winding end Luas, the directions of currents illustrated as all the dotted circles and the X circles in FIG. 1 can be implemented.

Figure 6:
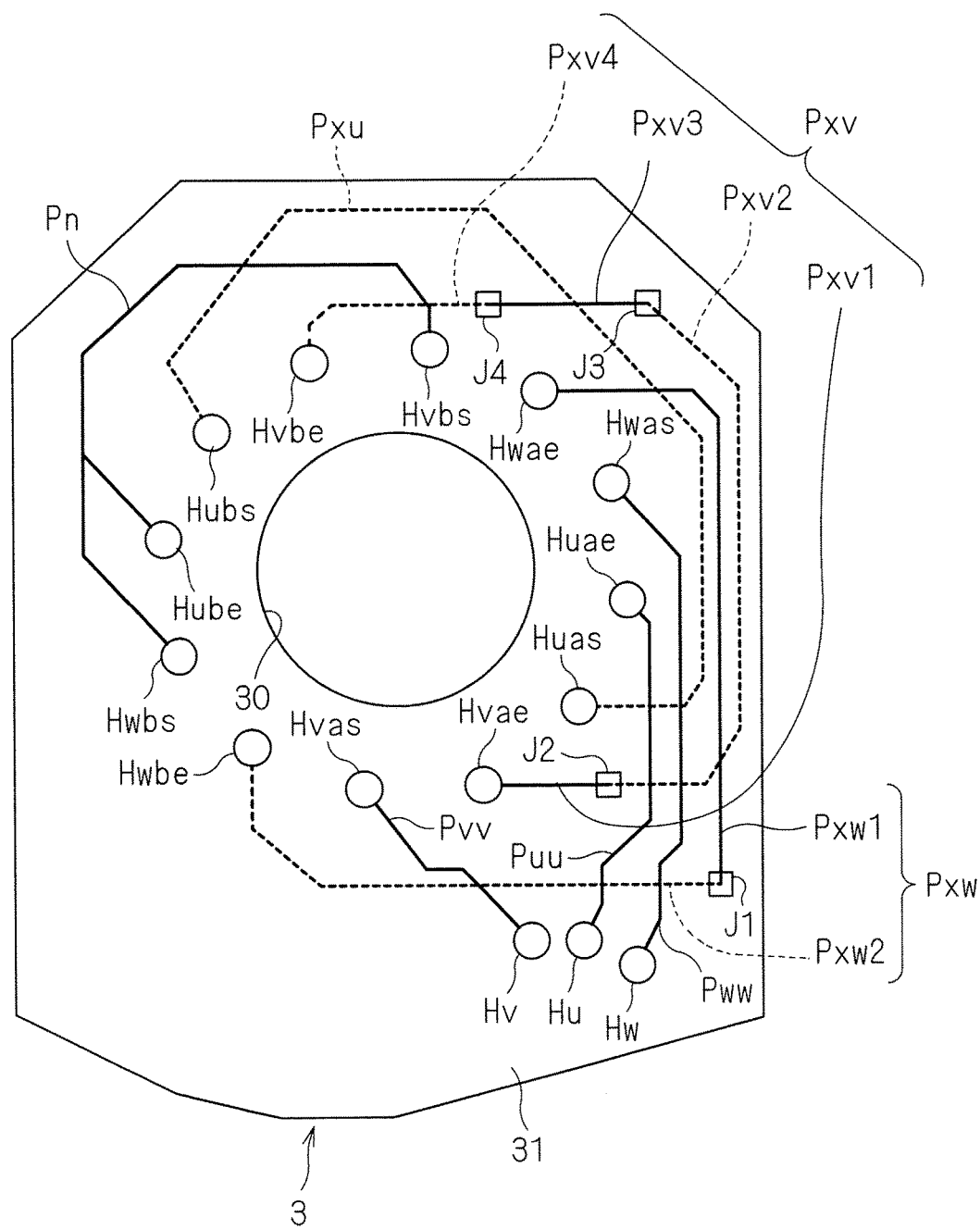
FIG. 6 is a wiring diagram illustrating a structure of a PCB.

FIG. 6 is a wiring diagram illustrating a structure of the PCB 3. The PCB 3 implements the connection state of the armature coils illustrated in FIG. 5. Specifically, the PCB 3 includes lands Hu, Hv, Hw, Huas, Huae, Hvas, Hvae, Hwas, Hwae, Hubs, Hube, Hvbs, Hvbe, Hwbs, and Hwbe. These lands include, for example, respective open holes. The PCB 3 has an open through-hole 30 almost matching the through-hole 10 so that the shaft pierces through the through-hole 30.

The first winding portion Lu3 of the tooth pair Tub, the second winding portion Lu4 of the tooth pair Tub, the first winding portion Lw3 of the tooth pair Twb, the second winding portion Lw4 of the tooth pair Twb, the first winding portion Lv1 of the tooth pair Tva, the second winding portion Lv2 of the tooth pair Tva, the first winding portion Lu1 of the tooth pair Tua, the second winding portion Lu2 of the tooth pair Tua, the first winding portion Lw1 of the tooth pair Twa, the second winding portion Lw2 of the tooth pair Twa, the first winding portion Lv3 of the tooth pair Tvb, and the second winding portion Lv4 of the tooth pair Tvb are arranged in the circumferential direction in this order.

The lands Huas, Huae, Hwas, Hwae, Hvbs, Hvbe, Hubs, Hube, Hwbs, Hwbe, Hvas, and Hvae are arranged counterclockwise in the circumferential direction in this order.

The pin connected to the second winding end of the second winding portion Lu2 is connected to the land Hu. The pin connected to the first winding end of the first winding portion Lv1 is connected to the land Hv. The pin connected to the first winding end of the first winding portion Lw1 is connected to the land Hw. The pin connected to the first winding end of the first winding portion Lu1 is connected to the land Huas. The pin connected to the first winding end of the first winding portion Lu3 is connected to the land Hubs. The pin connected to the second winding end of the second winding portion Lv2 is connected to the land Hvae. The pin connected to the second winding end of the second winding portion Lv4 is connected to the land Hvbe. The pin connected to the second winding end of the second winding portion Lw4 is connected to the land Hwbe. The pin connected to the second winding end of the second winding portion Lw2 is connected to the land Hwae. The pin connected to the second winding end of the first winding portion Lu1 is connected to the land Huae. The pin connected to the second winding end of the first winding portion Lu3 is connected to the land Hube. The pin connected to the first winding end of the second winding portion Lv2 is connected to the land Hvas. The pin connected to the first winding end of the second winding portion Lv4 is connected to the land Hvbs. The pin connected to the first winding end of the second winding portion Lw4 is connected to the land Hwbs. The pin connected to the first winding end of the second winding portion Lw2 is connected to the land Hwas.

The PCB 3 has first layer wiring patterns indicated by solid lines and second layer wiring patterns indicated by dashed lines. These patterns are included in different wiring layers with an insulating layer 31 therebetween. These first layer wiring patterns and second layer wiring patterns sufficiently provide wiring layers necessary for the PCB 3. The insulating layer 31 includes through-holes J1 to J4 for connecting parts of the first layer wiring patterns to parts of the second layer wiring patterns.

The PCB 3 has, in the first layer wiring patterns, a wiring pattern Puu for mutually connecting the lands Hu and Huae, a wiring pattern Pvv for mutually connecting the lands Hv and Hvas, and a wiring pattern Pww for mutually connecting the lands Hw and Hwas.

The PCB 3 has a wiring pattern Pn functioning as the connection point N. The wiring pattern Pn mutually connects the second winding end (portion with the symbol "e" in the second winding portion Lu4) of the tooth pair Tub, the first winding end (portion with the symbol "s" in the first winding portion Lv3) of the tooth pair Tvb, and the first winding end (portion with the symbol "s" in the first winding portion Lw3) of the tooth pair Twb. Specifically, the wiring pattern Pn mutually connects the lands Hwbs, Hube, and Hvbs. The wiring pattern Pn is provided as the first layer wiring pattern.

The PCB 3 has wiring patterns Pxu, Pxv, and Pxw functioning as the connection points Xu, Xv, and Xw, respectively.

The wiring pattern Pxu mutually connects the first winding end (portion with the symbol "s" in the first winding portion Lu3) of the tooth pair Tub and the first winding end (portion with the symbol "s" in the first winding portion Lu1) of the tooth pair Tua. Specifically, the wiring pattern Pxu mutually connects the lands Hubs and Huas. The wiring pattern Pxu is provided as the second layer wiring pattern.

The wiring pattern Pxw mutually connects the second winding end (portion with the symbol "e" in the second winding portion Lw4) of the tooth pair Twb and the second winding end (portion with the symbol "e" in the second winding portion Lw2) of the tooth pair Twa. Specifically, the wiring pattern Pxw mutually connects the lands Hwbe and Hwae.

The wiring pattern Pxw includes a wiring pattern Pxw1 provided as the first layer wiring pattern, and a wiring pattern Pxw2 provided as the second layer wiring pattern. Then, the wiring patterns Pxw1 and Pxw2 are mutually connected through the through-hole J1 represented by a rectangle in FIG. 6 because the wiring pattern Pxw prevents interference with the wiring patterns Puu, Pvv, and Pww in the first layer wiring pattern.

The wiring pattern Pxv mutually connects the second winding end (portion with the symbol "e" in the second winding portion Lv4) of the tooth pair Tvb and the second winding end (portion with the symbol "e" in the second winding portion Lv2) of the tooth pair Tva. Specifically, the wiring pattern Pxv mutually connects the lands Hvbe and Hvae.

The wiring pattern Pxv includes wiring patterns Pxv1 and Pxv3 provided as the first layer wiring patterns, and wiring patterns Pxv2 and Pxv4 provided as the second layer wiring patterns. Then, the wiring patterns Pxv1 and Pxv2 are connected through the through-hole J2, the wiring patterns Pxv2 and Pxv3 are connected through the through-hole J3, and the wiring patterns Pxv3 and Pxv4 are connected through the through-hole J4. This is because the wiring pattern Pxv prevents interference with the wiring patterns Pn, Pxw1, Puu, Pvv, and Pww in the first layer wiring patterns, and with the wiring pattern Pxu in the second layer wiring patterns. Alternatively, without using the wiring pattern Pxv1 and the through-hole J2, the wiring pattern Pxv2 may be directly connected to the land Hvae.

Figure 7:
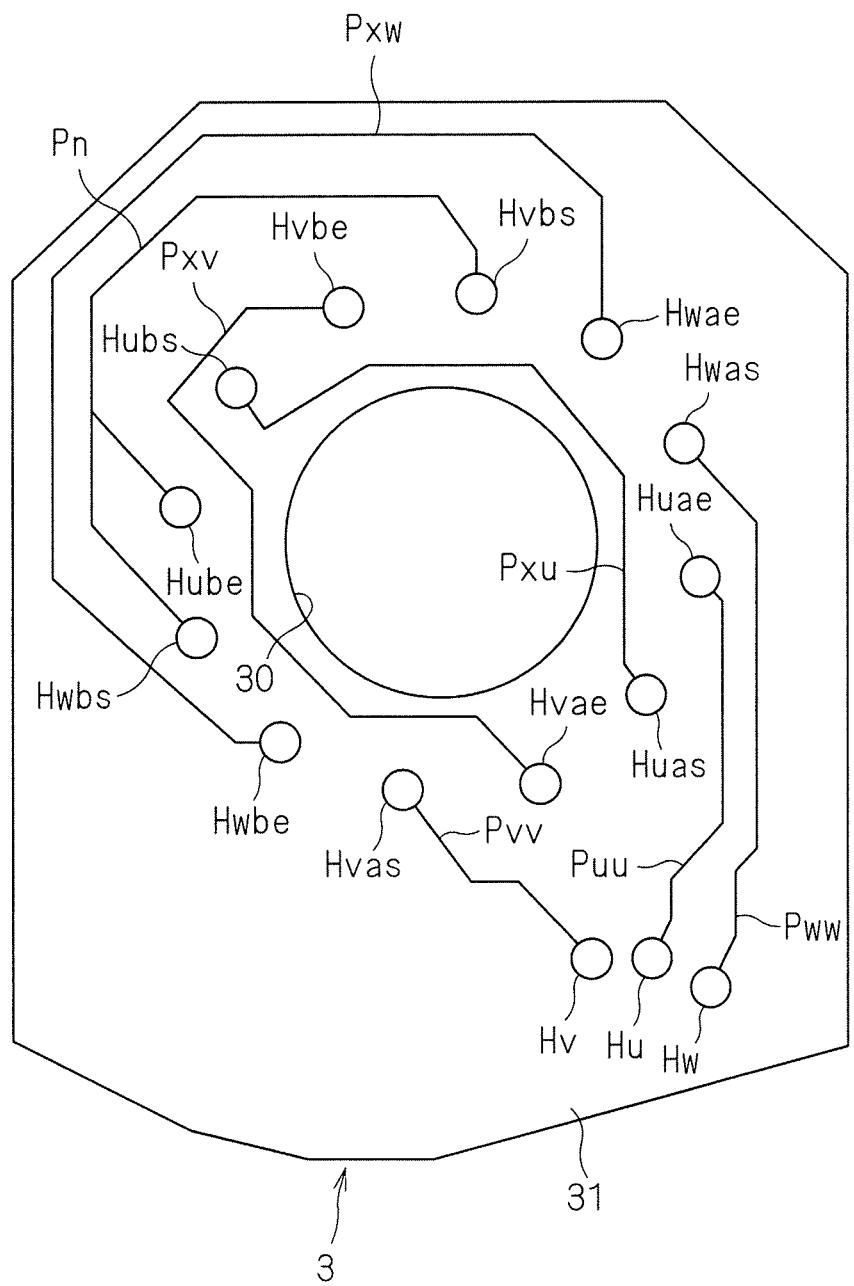
FIG. 7 is a wiring diagram illustrating another structure of a PCB.

FIG. 7 is a wiring diagram illustrating another structure of the PCB 3. The PCB 3 in FIG. 7 also includes the lands Hu, Hv, Hw, Huas, Huae, Hvas, Hvae, Hwas, Hwae, Hubs, Hube, Hvbs, Hvbe, Hwbs, and Hwbe as the PCB 3 in FIG. 6. The PCB 3 in FIG. 7 implements the connection state of the armature coils illustrated in FIG. 5 using single-layered wiring patterns.

The wiring patterns Puu, Pvv, Pww, and Pn in FIG. 7 are provided similarly as the wiring patterns Puu, Pvv, Pww, and Pn in FIG. 5. In FIG. 7, the wiring pattern Pxw is provided at the opposite side of an annular arrangement of the lands with respect to the wiring pattern Pn, and mutually connects the lands Hwae and Hwbe. Furthermore, the wiring pattern Pxu is provided inner than the annular arrangement of the lands (closer to the through-hole 30), and mutually connects the lands Huas and Hubs. Furthermore, the wiring pattern Pxv is provided inner than the annular arrangement of the lands, and mutually connects the lands Hvae and Hvbe.

Since an armature coil has been wound around every tooth in the conventional technique, the one tooth has a pair of winding ends. Furthermore, paired pins around which paired winding ends are wound have been arranged on a PCB at different positions in a radial direction of the armature for the convenience of the winding. In other words, the lands to be connected to the pins have been double annularly arranged on the PCB. Thus, the wiring patterns have been provided outside of the annular lands on the PCB.

However, a single annular arrangement of the lands is sufficient according to the embodiment as described above. This is because the armature coil with two winding portions are continuously wound around a pair of adjacent teeth through a crossover portion (e.g., the first winding portion Lu1 and the second winding portion Lu2 are continuously wound around the teeth Tu1 and Tu2, respectively, through the crossover portion Luab), and only one pin is arranged on the PCB 3 per tooth.

Thus, the wiring patterns can be provided both inner than and outside of the annular arrangement of the lands, and the single-layered wiring patterns can implement the connection state of the armature coils illustrated in FIG. 5 as described above. Thus, the structure of the PCB 3 is simplified, the manufacturing processes are eased, and the manufacturing costs are reduced.

Figure 8:
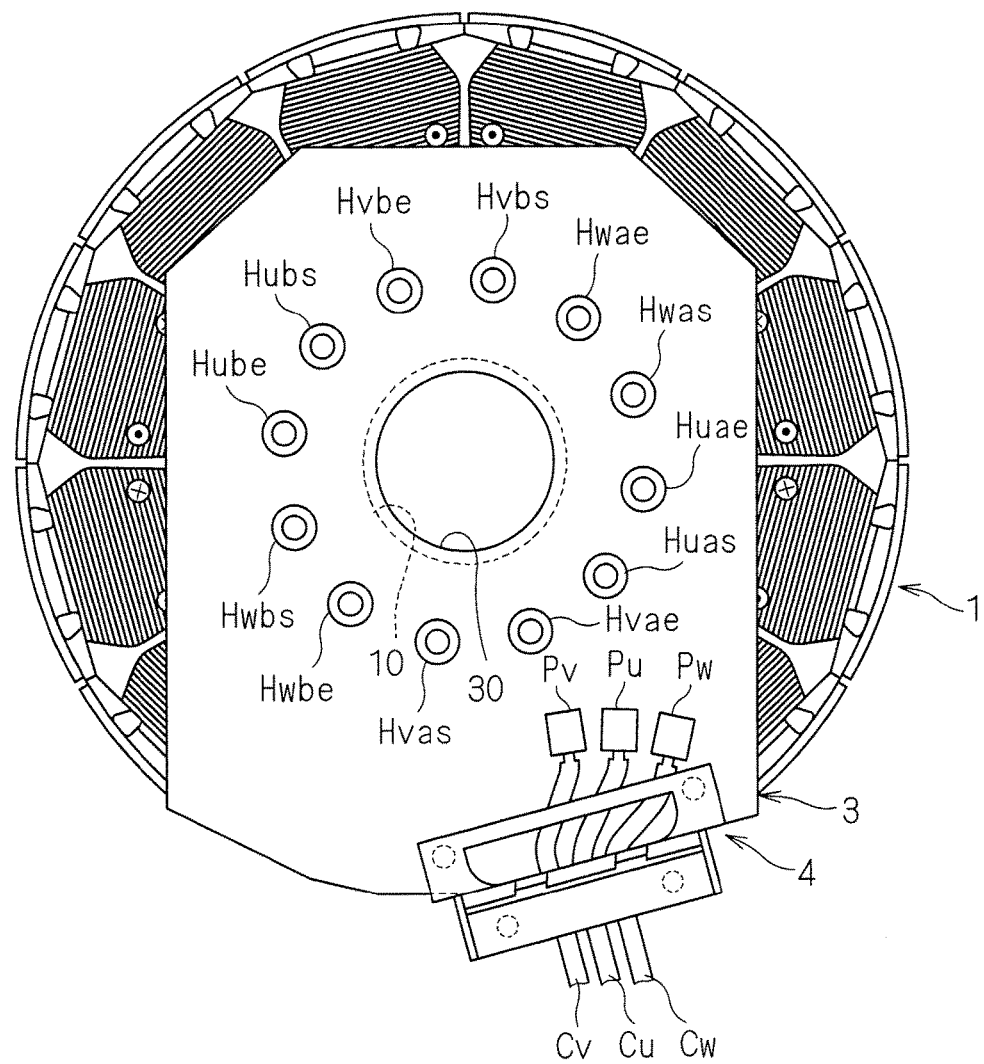
FIG. 8 is a plan view illustrating a structure of an armature.

FIG. 8 is a plan view illustrating a structure of the armature 1, and illustrates a state in which the PCB 3 is arranged from the front of the paper towards the structure illustrated in FIG. 1. FIG. 8 illustrates a state where each of the lands has an open hole and a pin to which the first winding end or the second winding end is connected enter each of the holes (each circle inside of the circle representing the land schematically illustrates the pin). Furthermore, although FIG. 8 exemplifies a case where the through-hole 30 is smaller than the through-hole 10, the through-hole 30 may be larger than the through-hole 10.

The PCB 3 is equipped with a connector 4. Cables Cu, Cv, and Cw supply the U-phase voltage, the V-phase voltage, and the W-phase voltage, and are connected to the lands Hu, Hv, and Hw (see FIG. 6) through terminals Pu, Pv, and Pw, respectively.

Using the PCB 3 in such a manner, the armature 1 generates a 12-pole rotating electric field with application of the three-phase voltages to the second winding end of the tooth pair Tua, the first winding end of the tooth pair Tva, and the first winding end of the tooth pair Twa.

A rotating electric machine that employs the PCB 3 is desirably of an outer rotor type, considering that the PCB 3 can be miniaturized. This is because the lands Huas, Huae, Hwas, Hwae, Hvbs, Hvbe, Hubs, Hube, Hwbs, Hwbe, Hvas, and Hvae are arranged in the inner circumferential side of the rotating electric machine.

The rotating electric machine of an outer rotor type is suitable for, for example, driving cross-flow fans to be employed in indoor units of air conditioners.

FIG. 9 is a cross-sectional view illustrating a structure of a cross-flow fan 80 and a rotating electric machine for driving the cross-flow fan 80. The hatching of the cross-flow fan 80 has been omitted to avoid the complication in the drawing. Furthermore, the armature 1 has been simply illustrated by alternate long and short dashed lines.

The cross-flow fan 80 is fixed to the mounting surface 22 of the field element 2 by a fastener (not illustrated) through the mounting holes 23. Accordingly, rotation of the field element 2 induces rotation of the cross-flow fan 80. In other words, the rotating electric machine including the field element 2 drives the cross-flow fan 80.

A shaft 81 of the cross-flow fan 80 pierces through the shaft hole 20 and the through-hole 30 (actually including the through-hole 10), and is supported by a supporting mechanism that is not illustrated, to be rotatable against the armature 1.

Since the supporting mechanism, the fastener, and the structure of the cross-flow fan 80 can be obtained using known techniques, the detailed description is omitted herein.

In the rotating electric machine of an outer rotor type that drives the cross-flow fan 80, its rotor is greater in diameter. Thus, the area of the magnets 21 can be increased when designed. This is suitable because the necessary magnetic fluxes are obtained even when the magnetic flux density of the magnets 21 is lower. Furthermore, when the magnets 21 are resin magnets, the magnets 21 have an advantage that a material with a lower magnetic flux density such as a ferrite magnet suffices as a magnetic powder to be dispersively mixed in the magnets 21. This is more advantageous in contributing to low manufacturing costs than the magnets 21 using a rare-earth magnet such as NdFeB as the magnetic powder.

The rotating electric machine of an outer rotor type easily polarizes the magnets 21. Since the rotating electric machine has a larger outside diameter, the arc length per pole is made longer. Thus, when the dimensional tolerance in mass production is consistent as the absolute value (e.g., ±0.1 mm, etc.), the dimensional deviation in polar angle can be set with higher precision for the mass production than that of magnets with a smaller diameter to be employed by a rotating electric machine of an inner rotor type. This is advantageous in reducing the vibration and noise.

When types of magnets are identical, such as ferrite magnets or rare-earth magnets, the resin magnets contribute to lower manufacturing costs than sintered magnets by reduction in the number of magnet-fixing parts and the number of processes (processes for the sintered magnets including the c-plane polishing and the grinding for dimensioning can be omitted).

Furthermore, when the magnets 21 are resin magnets, the field element 2 with different number of poles is easily obtained. This is because a mold and a magnetizing yoke have only to be newly built for the resin magnets with different number of poles while the armature 1 remains the same as conventional armatures. Particularly, when a rotor is solely composed of resin magnets, parts for fixing the magnets 21 do not have to be newly produced per different numbers of poles of the magnets, and the parts can be the same as the conventional ones.

Figure 11:
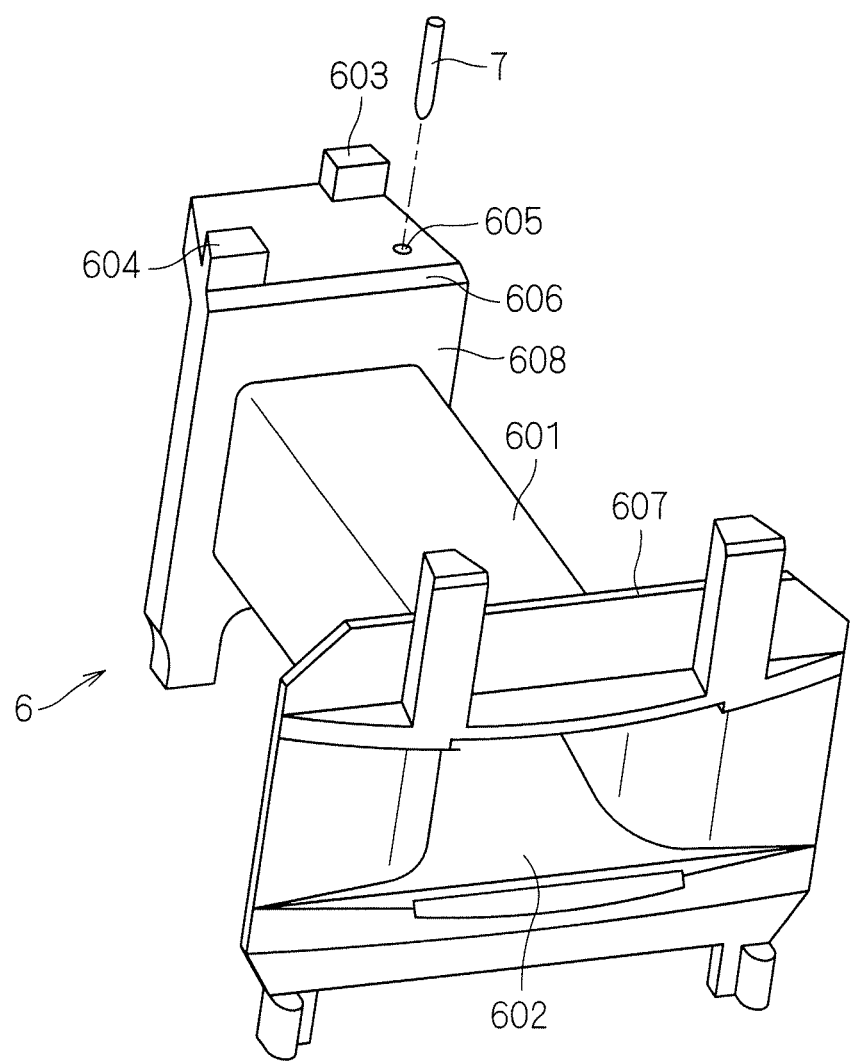
FIG. 11 is a perspective view illustrating a shape of an insulator.

FIGS. 10 and 11 are perspective views each illustrating a shape of an insulator 6. The insulator 6 covers each of the teeth, and an armature coil is wound therearound.

The insulator 6 includes a first plate 608 placed at the first end portion (farther from the field element 2) of each of the teeth, a second plate 607 placed at the second end portion (closer to the field element 2), and a bobbin 601 around which an armature coil is wound between the first plate 608 and the second plate 607. The bobbin 601 includes an inner circumferential surface 602 at its inner side.

The first plate 608 has an open hole 605 into which a pin 7 is inserted. The pin 7 is connected to the first winding end or the second winding end of the armature coil.

The first plate 608 has protrusions 603 and 604 that protrude through the same surface which is provided with the pin 7. The protrusions 603 and 604 function as the protrusions Ju1 and Ku1 (alternatively, the protrusions Ju2 and Ku2, see FIG. 4), respectively.

The first plate 608 has an oblique surface 606 at a portion closer to the field element 2, where the pin 7 and the protrusions 603 and 604 are provided. With reference to FIG. 4 with the tooth pair Tua exemplified, the oblique surface prevents the first plate 608 from locally exerting a strong force on a wire that passes from the first winding portion Lu1 or the second winding portion Lu2 to the pin 7 or on a wire across a boundary between the crossover portion Luab and the first winding portion Lu1 or the second winding portion Lu2.

Figure 12:
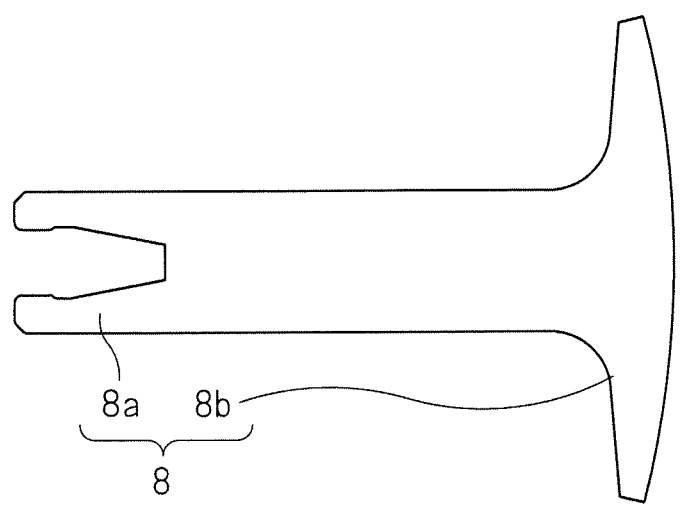
FIG. 12 is a plan view illustrating a shape of a teeth core.

FIG. 12 is a plan view illustrating a shape of a tooth core 8 included in each of the teeth. The tooth core 8 is made of, for example, an electromagnetic steel plate laminated in the vertical direction of the paper. The tooth core 8 includes a connecting part 8a and a magnetic pole part 8b.

The tooth core 8 is inserted into the bobbin 601 so that the connecting part 8a is placed closer to the first plate 608 and the magnetic pole part 8b is placed closer to the second plate 607. Accordingly, the inner circumferential surface 602 covers the tooth core 8.

Figure 13:
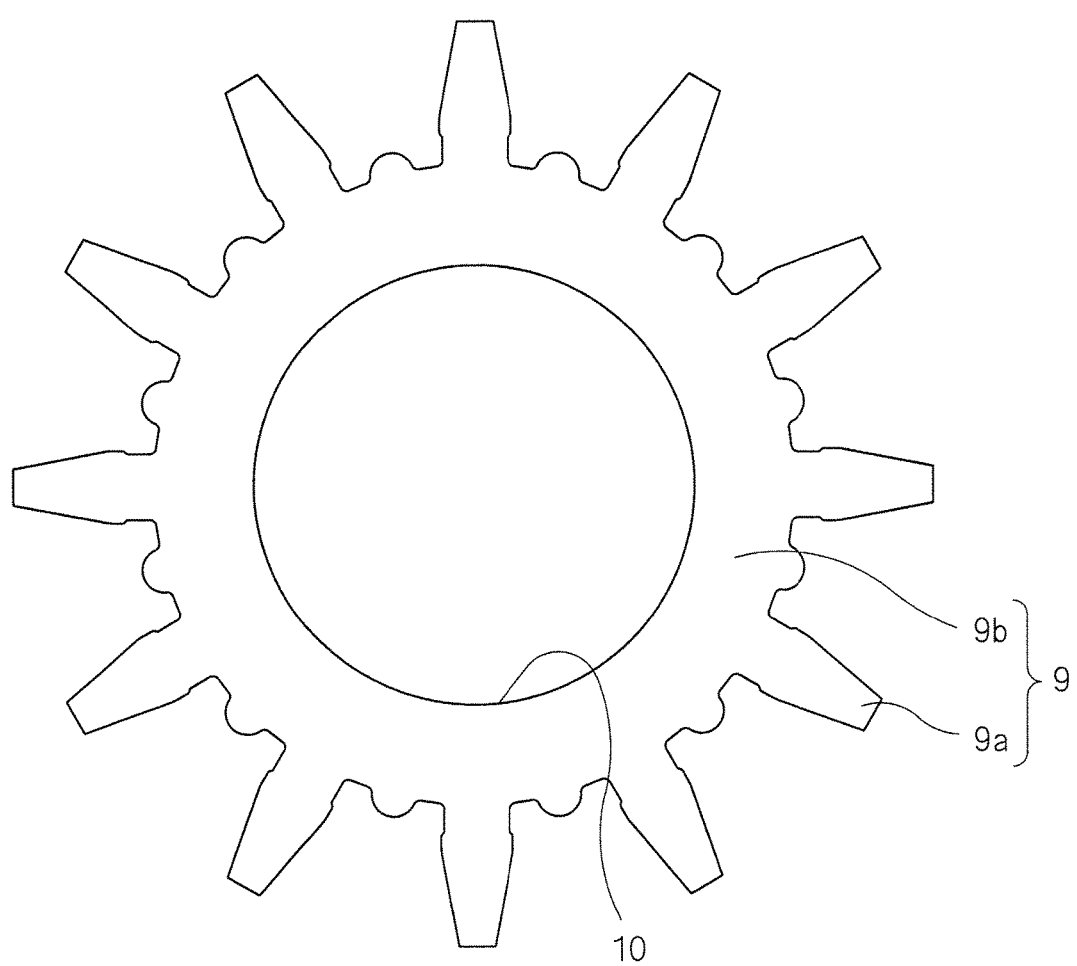
FIG. 13 is a plan view illustrating a shape of a yoke core.

FIG. 13 is a plan view illustrating a shape of a yoke core 9. The yoke core 9 is made of, for example, an electromagnetic steel plate laminated in the vertical direction of the paper. The yoke core 9 includes connecting parts 9a and a coupling part 9b.

The connecting parts 9a are annularly arranged, and are coupled to the coupling part 9b. The connecting parts 8a and 9a are mutually combined to be coupled together. Thus, coupling pairs of the tooth cores 8 that are used for pairs of the teeth to the connecting parts 9a that are adjacent in the circumferential direction enables the obtainment of the structure illustrated in FIG. 1. For example, the through-hole 10 of the armature 1 is opened at the coupling part 9b.

Figure 14:
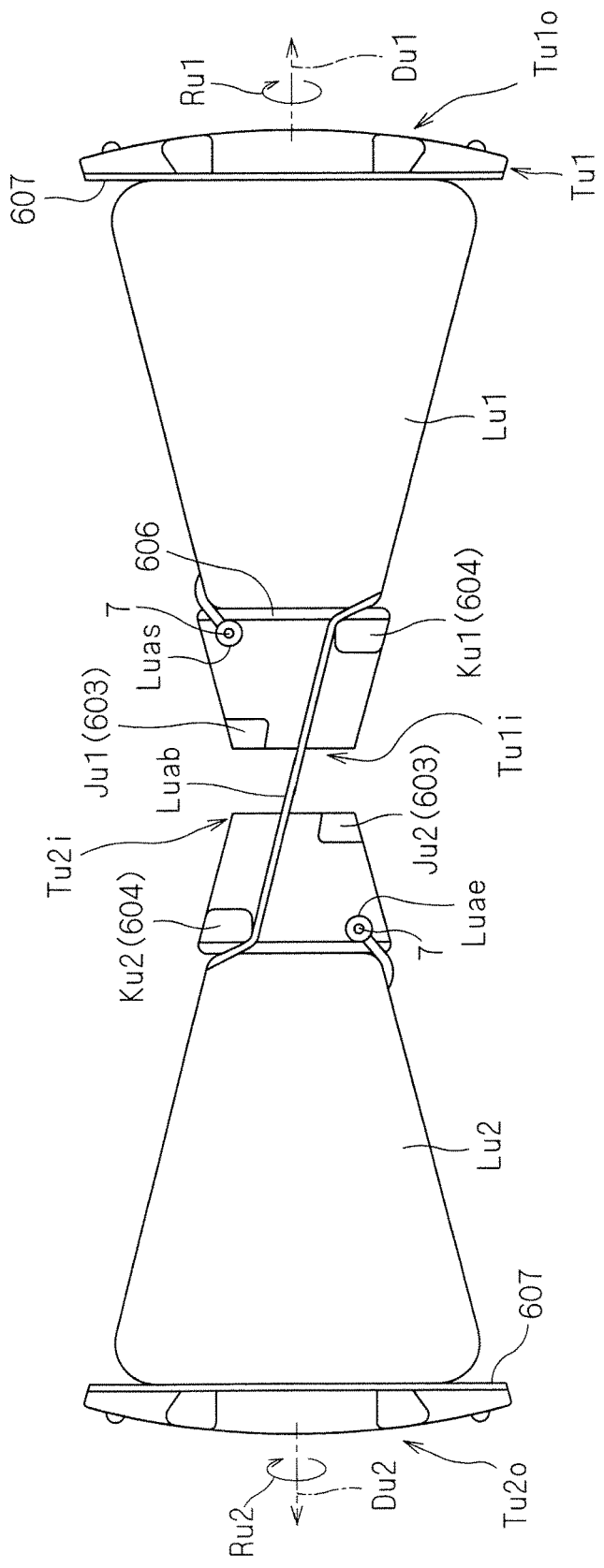
FIG. 14 is a plan view describing a method for winding an armature coil around a tooth pair.

FIG. 14 is a plan view describing a method for manufacturing the tooth pair Tua. The first end portions Tu1i and Tu2i of the teeth Tu1 and Tu2, respectively, that form the tooth pair Tua are arranged opposite to each other to obtain a first structure. For example, the insulators 6 are arranged in a direction in which the second plates 607 move away from each other, and rod-like fixtures are inserted commonly into the respective bobbins 601, before inserting the tooth cores 8 into the pair of teeth Tu1 and Tu2.

In the first structure, a wire is wound around the insulator 6 of each of the teeth Tu1 and Tu2 in one direction. Specifically, after the wire is wound around the pin 7 as the first winding end Luas, the wire is wound in the winding direction Ru1 to form the first winding portion Lu1.

Then, the wire passes between the protrusion Ku1 (protrusion 604 of the insulator) and the protrusion Ju1 (protrusion 603 of the insulator) and between the protrusion Ku2

(protrusion 604 of the insulator) and the protrusion Ju2 (protrusion 603 of the insulator) to form the crossover portion Luab.

Furthermore, the wire is wound in the winding direction Ru2 to form the second winding portion Lu2, and is wound around the pin 7 as the second winding end Luae.

Since the first end portions Tu1i and Tu2i for the teeth Tu1 and Tu2, respectively, are arranged opposite to each other in the first structure, the winding directions Ru1 and Ru2 are identical to each other. Thus, in the winding of the wire, there is no need to change the winding direction. In other words, the armature coil is easily wound.

The winding directions Ru1 and Ru2 are directions directing from the lower side to the upper side with respect to the front of the paper. Thus, the crossover portion Luab is inclined from the lower right to the upper left of the paper. Accordingly, the crossover portion Luab is hooked to the protrusions Ku1 and Ku2. Thus, the tension that may cause the first winding portion Lu1 and the second winding portion Lu2 to go out of round (come loose) is hardly exerted on the first winding portion Lu1 and the second winding portion Lu2.

Consequently, a second structure illustrated in FIG. 14 is obtained. Then, bringing the second end portions Tu1o and Tu2o of the teeth Tu1 and Tu2, respectively, in the second structure closer to each other and directing the first end portions Tu1i and Tu2i almost in the same direction yields a third structure. Specifically, rotating the tooth Tu1 counterclockwise with respect to the approximate center of the crossover portion Luab as the rotation center in FIG. 14 yields the structure illustrated in FIG. 4. Even when the tension that may cause the first winding portion Lu1 and the second winding portion Lu2 to go out of round (come loose) occurs by moving the teeth Tu1 and Tu2, it is hardly exerted on the first winding portion Lu1 and the second winding portion Lu2 because the crossover portion Luab is hooked to the protrusion Ju1.

The protrusion Ju2 does not contribute to positioning of the wire and thus can be omitted in obtaining both the second and third structures.

The tooth core 8 is inserted into the bobbin 601 of each of the insulators 6 in the third structure. Accordingly, the tooth pair Tua in the state illustrated in FIG. 4 can be obtained. A step of inserting the tooth core 8 into the bobbin 601 of each of the insulators 6 in the second structure may be performed.

Similarly, the other tooth pairs can be easily manufactured by winding armature coils.

Since all the description above is exemplifications, obviously, it can be appropriately modified within a scope where the effect is not obstructed.

While the disclosure has been shown and described in detail, the foregoing description is in all aspects illustrative and not restrictive. It is therefore understood that numerous modifications and variations can be devised without departing from the scope of the disclosure.

The invention claimed is:

1. An armature composing a rotating electric machine including a field element having $(12\pm2)n$ poles, n being a positive integer, said armature comprising:
   12n teeth arranged in a circumferential direction; and
   an armature coil concentratedly wound around each of said teeth,
   said teeth being divided into 6n tooth pairs, each of said tooth pairs including a pair of teeth adjacent in said circumferential direction,
   each of said teeth including a first end portion that is farther from said field element, and a second end portion that is closer to said field element,
   said armature coil being continuously wound around each of said tooth pairs and including: a first winding end existing at said first end portion of one of said pair of teeth; a second winding end existing at said first end portion of the other of said pair of teeth;
   a crossover portion;
   a first winding portion being wound around said one of said pair of teeth between said first winding end and said crossover portion; and a second winding portion being wound around the other of said pair of teeth between said crossover portion and said second winding end,
   wherein said armature coil in said first winding portion is wound in a first winding direction with respect to a direction obtained in viewing said second end portion from said first end portion of said one of said pair of teeth, as said armature coil passes from said first winding end to said crossover portion,
   said armature coil in said second winding portion is wound in a second winding direction with respect to a direction obtained in viewing said second end portion from said first end portion of the other of said pair of teeth, as said armature coil passes from said crossover portion to said second winding end,
   said first winding direction is opposite to said second winding direction; and
   a printed circuit board including:
   a wiring pattern mutually connecting said second winding end of a first one of said tooth pairs, said first winding end of a second one of said tooth pairs, and said first winding end of a third one of said tooth pairs;
   a wiring pattern mutually connecting said first winding end of said first one of said tooth pairs and said first winding end of a fourth one of said tooth pairs;
   a wiring pattern mutually connecting said second winding end of said second one of said tooth pairs and said second winding end of a fifth one of said tooth pairs; w
   a wiring pattern mutually connecting said second winding end of said third one of said tooth pairs and said second winding end of a sixth one of said tooth pairs,
   wherein said first winding portion of said first one of said tooth pairs, said second winding portion of said first one of said tooth pairs, said first winding portion of said third one of said tooth pairs, said second winding portion of said third one of said tooth pairs, said first winding portion of said fifth one of said tooth pairs, said second winding portion of said fifth one of said tooth pairs, said first winding portion of said fourth one of said tooth pairs, said second winding portion of said fourth one of said tooth pairs, said first winding portion of said sixth one of said tooth pairs, said second winding portion of said sixth one of said tooth pairs, said first winding portion of said second one of said tooth pairs, and said second winding portion of said second one of said tooth pairs are arranged in said circumferential direction in this order.

2. A rotating electric machine including said armature according to claim 1 and said field element.

3. The rotating electric machine according to claim 2, wherein said field element includes magnets surrounding said armature, and said rotating electric machine is of an outer rotor type.

4. A cross-flow fan driven by said rotating electric machine according to claim 3.

5. The rotating electric machine according to claim 3, wherein said magnets are resin magnets.

6. A cross-flow fan driven by said rotating electric machine according to claim 5.

7. A method for manufacturing said tooth pairs to be employed in said armature according to claim 1, said method comprising the steps of:
- arranging said first end portions of said pair of teeth that form each of said tooth pairs to be opposite to each other to obtain a first structure;
- winding a wire around said pair of teeth in one direction in said first structure and forming said armature coil on said pair of teeth to obtain a second structure; and
- bringing said second end portions of said pair of teeth in said second structure closer to each other and directing said first end portions almost in a same direction.

* * * * *